United States Patent Office 3,337,792
Patented Aug. 22, 1967

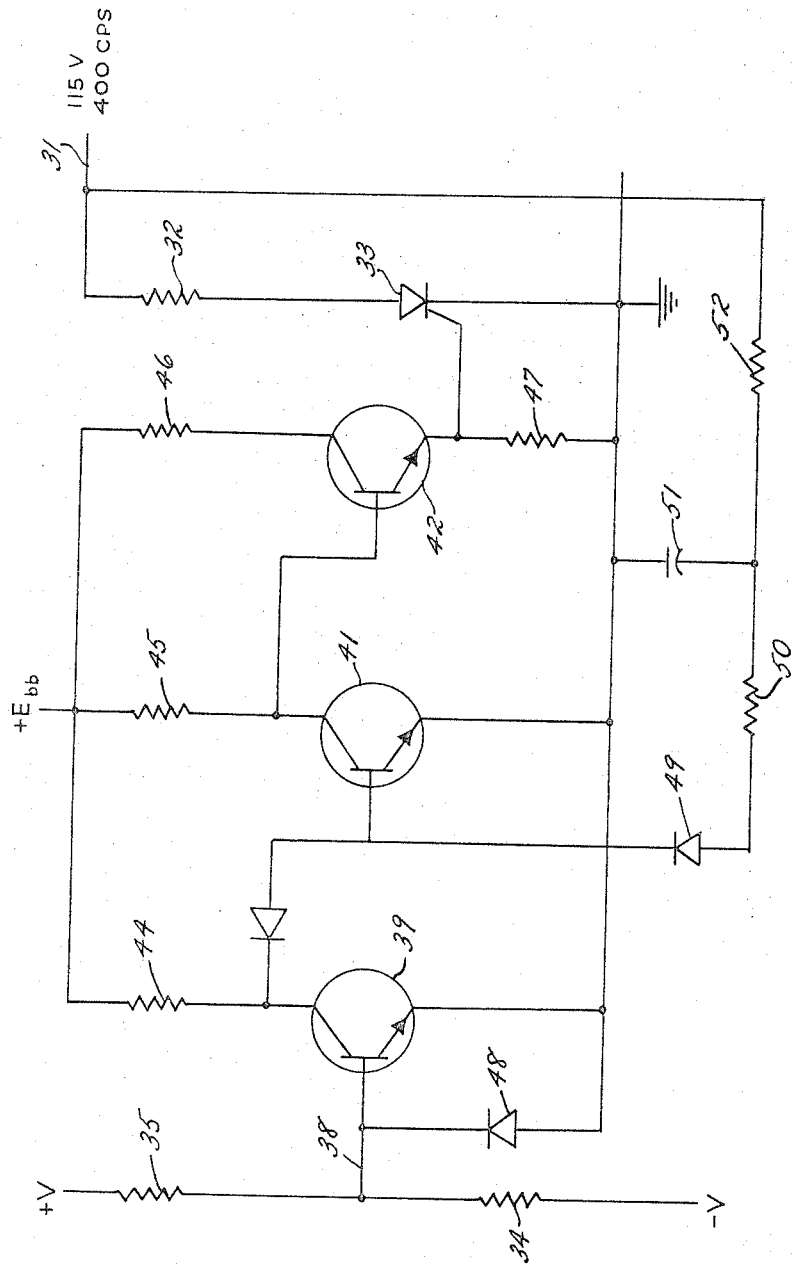

3,337,792
FIRING ANGLE CONTROL CIRCUIT FOR SILICON CONTROLLED RECTIFIERS
Bernard Engelson, Franklin Square, N.Y., assignor to Loral Electronics Corporation, New York, N.Y.
Filed July 9, 1963, Ser. No. 293,751
3 Claims. (Cl. 323—22)

This invention relates generally to the field of circuits incorporating a silicon controlled rectifier, for the purpose of making said circuit conductive, and more particularly to an improved means for controlling the operation of such silicon controlled rectifier in such manner that operation of the same does not generate high frequency energy.

The use of temperature sensitive components in relatively complicated electronic devices has led to widespread use of thermostatically controlled heaters to maintain such temperature sensitive components or circuits at a reasonably constant temperature in the face of widely varying ambient temperature. Apart from the reliability aspect, there is a severe problem associated with the simple bi-metallic thermostat heater circuit, in that there is a large amount of high frequency energy generated by the steep wavefront formed by suddenly applying and removing heater power when the thermostat contacts open or close.

Sensitive pulse circuitry located near the heater may pick up a sufficient amount of this energy to cause performance of such circuitry to be degraded.

It is known in the art to use heater control circuits which substitute a thermistor and amplifier in place of the thermostat with the heater power applied through a relay or a silicon controlled rectifier, but the steep wavefront still exists with its corresponding generation of interference. Proportional, direct current, heater control using a series pass transistor may be employed to solve the problem, but at the expense of a large amount of power dissipation at the pass transistor.

It is therefore among the principal objects of the present invention to provide an improved circuit which employs a silicon controlled rectifier to switch power to a heater, but in such manner that very little high frequency energy is generated.

Another object of the invention lies in the provision of an improved silicon controlled rectifier circuit in which power is switched on only during such periods in which the alternating current power employed as a heater current is near a cross-over point, that is to say in which the voltage is at a relatively low level in the course of a single cycle, wherein current surge will be at a minimum, and corresponding high frequency energy generated will also be at a minimum.

A further object of the invention lies in the provision of an improved firing angle control circuit for silicon rectifiers which may add but little complication to existing prior art circuits while achieving the desired end.

A feature of the invention lies in the fact that the improved circuitry requires very little more bulk and weight than existing prior art circuits, thereby permitting consequent wide employment to replace existing circuitry.

A feature of the invention lies in the fact that the operation of the novel structure is entirely automatic.

These objects and features, as well as other incidental ends and advantages, will more fully appear in the progress of the following disclosure, and be pointed out in the appended claims.

In the drawings:

FIGURE 3 is a schematic wiring diagram of the embodiment.

Figure 1:
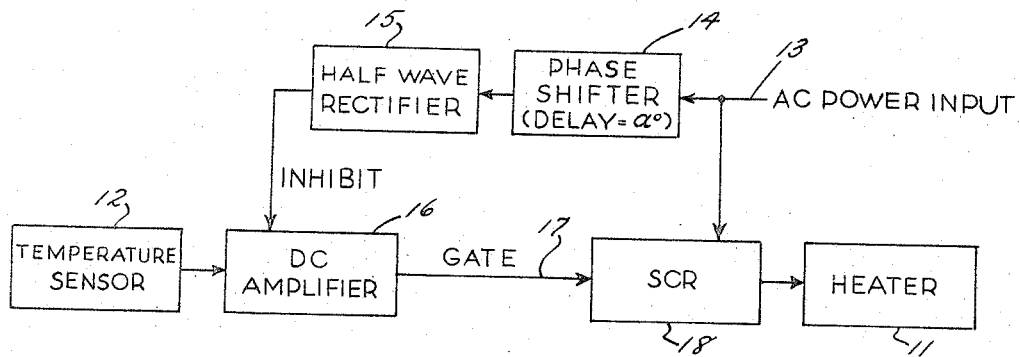
FIGURE 1 is a schematic block diagram showing an embodiment of the invention.

In accordance with the invention, there is illustrated in FIGURE 1 in the drawings a typical heater circuit employed for maintaining a temperature sensitive component of an electronic circuit at a relatively uniform temperature level, including a heater element 11, a temperature sensor 12, a source of alternating current power 13, a phase shifter element 14, a half wave rectifier element 15, a DC amplifier element 16, a gate passing a triggering current 17 formed by the control electrode of a silicon controlled rectifier 18. As is known in the art, the temperature sensor 12 may take the form of a thermistor, which supplies a sensing current to the DC amplifier 16. This sensing current when properly amplified is supplied to the gate of the silicon controlled rectifier in well-known maner, wherein AC power is permitted to flow to the heating coils of the heater 11.

Figure 2:
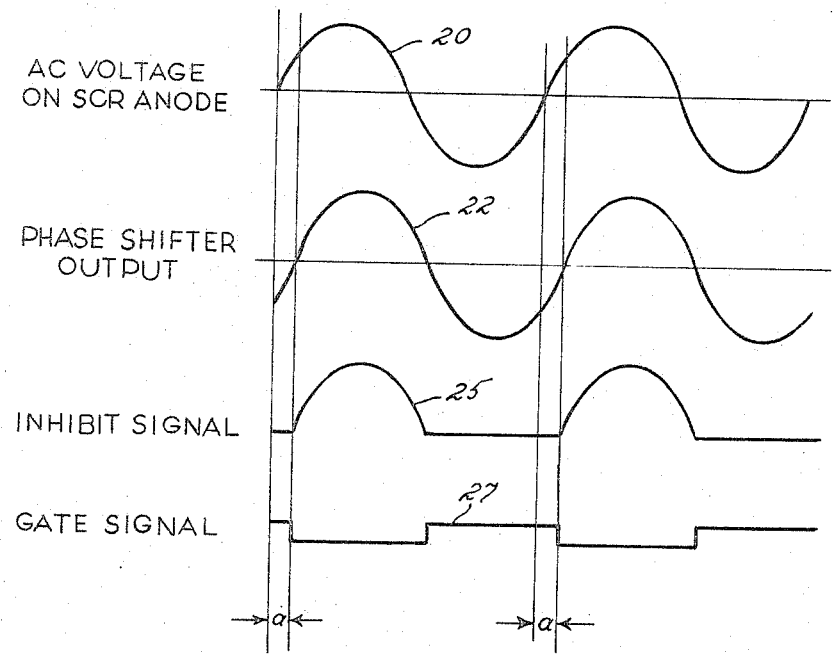
FIGURE 2 is a graph illustrating wave forms developed by the embodiment during operation.

Referring to FIGURE 2, there is illustrated a first graph 20, which forms a simple sine wave illustrative of the alternating current power input. It will be observed that when power is connected or disconnected at or near the crossover point, relatively little high frequency energy is generated, owing to the fact that the voltage is at low level, and the current surge occurring on connection is correspondingly low. However, should the silicon controlled rectifier which controls the flow of current become conductive at a time during a cycle where voltage is at or near the peak, that is to say the crest of the sine wave, a correspondingly larger surge of the current occurs, with accompanying generation of high frequency energy.

Referring to the second graph 22, operation of the phase shifter element 14 produces a current alpha ($\alpha$) degrees out of phase with the sine wave illustrated in the first graph 20, which, when fed to the half wave rectifier element 15, produces an inhibiting signal illustrated in the third graph 25. If the inhibiting signal illustrated in the third graph is superimposed upon the triggering current provided by the DC amplifier element 16, the gate signal takes the form shown in the fourth graph 27, where it will be observed that the gated signal may be transmitted only at a time where the current lies within the angle alpha ($\alpha$), the degree of phase shift.

Reference is now made to FIGURE 3 in the drawing, where there is illustrated a circuit schematic of the embodiment, including the alternating current source of power 31, the heater resistance 32, the silicon controlled rectifier 33, the thermistor 34, and a resistor 35 in series with the thermistor across a voltage (V). A conductor 38 leads to a first transistor 39, which feeds a second transistor 41, and a third transistor 42 in normal amplification stages. These are connected in well-known manner, including load resistors 44, 45, 46 and 47, the diode 48 serving to protect the transistor 39 against excessive reverse base to emitter voltage.

To provide a phase shifter element, a resistance network including a diode 49, resistor 50, capacitor 51, and resistor 52 are connected as illustrated. From a consideration of FIGURE 3, it will be apparent that when the thermistor resistance is greater than the resistor 35, the first transistor 39 is conductive, the second transistor 41 is non-conductive, and the third transistor 42 is conductive, wherein the silicon controlled rectifier 33 is driven to positive state whereby it conducts and applies heater power. When the thermistor resistance drops below that of the resistor 35, the first transistor 39 is made non-conductive, the second transistor 41 is conductive, and the third transistor 42 is non-conductive. There is therefore no current to the silicon controlled rectifier, and upon the following reversal of voltage applied to the silicon controlled rectifier through the heater, the silicon controlled rectifier turns off, removing the heater power. Since the silicon controlled rectifier cannot be turned off in the middle of a cycle of applied power, there is no steep wavefront generated in turning off. The above described problem exists, however, when current flow is resumed, since it is possible for the temperature sensor, i.e. the thermistor 34, to call for heater power to be applied while the positive half cycle of the voltage is on the silicon controlled rectifier anode. The addition of the members 49, 50, 51, and 52 function in such manner that the capacitor 51 and resistor 52 serve as the phase shift network which delays the alternating current voltage applied to resistor 50 and diode 49 by an angle alpha ($\alpha$). During the half cycle when the phase shifted alternating current is positive, current flowing through resistor 50 and diode 49 turn on the second transistor 41 which thereby keeps the third transistor 42 off, and prevents the silicon controlled rectifier gate from being turned on. The firing angle of the silicon controlled rectifier is thus limited to be within zero (0) and alpha ($\alpha$). Since the amplitude of the applied voltage at angle alpha ($\alpha$) is much smaller than the maximum voltage, the maximum step in voltage applied to the heater is greatly reduced in amplitude.

It will be readily understood that the disclosed embodiment of the invention is also applicable wherever an on-off control of half wave power is required, and where generation of switching transients would result in interference problems. The same principles disclosed may be employed, for example, with two silicon controlled rectifiers to provide full wave control, as distinguished from half wave control.

I wish it to be understood that I do not consider the invention limited to the precise details of structure shown and set forth in this specification, for obvious modifications will occur to those skilled in the art to which the invention relates.

I claim:

1. In an alternating current circuit including a silicon controlled rectifier, and a direct current amplifier providing a gating signal for making said alternating current circuit conductive, the improvement comprising: phase shifting means connected in said alternating current circuit and providing an inhibiting signal to said amplifier to allow emission of said gating signal only during the period of an individual cycle when voltage varies from minimum to that present at the degree of phase shift.

2. In an alternating current circuit including a silicon controlled rectifier for interrupting flow of current, a source of direct current sensing voltage, and a direct current amplifier providing a triggering current operating said silicon controlled rectifier, the improvement comprising: phase shifting means for providing a current ($\alpha$) alpha degrees out of phase with said alternating current, half wave rectifier means connected to said phase shifting means and providing an inhibiting signal to said direct current amplifier, said inhibiting signal being imposed upon said sensing voltage to limit transmission of a triggering current to said silicon controlled rectifier to that period of a given alternating current cycle in which the voltage varies between minimum and that obtained at angle alpha ($\alpha$).

3. In an alternating current circuit including a silicon controlled rectifier for interrupting flow of current, a source of direct current sensing voltage, and a direct current amplifier providing a triggering current operating said silicon controlled rectifier, the improvement comprising: phase shifting means for providing a current alpha ($\alpha$) degrees out of phase with said alternating current, half wave rectifier means connected to said phase shifting means and providing an inhibiting signal to said direct current amplifier, said inhibiting signal being imposed upon said sensing voltage to limit transmission of a triggering current to said silicon controlled rectifier to that period of a given alternating current cycle in which the voltage varies between minimum and that obtained at angle alpha ($\alpha$); said phase shifting means including a resistive-capacitive network.

References Cited

UNITED STATES PATENTS

| | | | |
|---|---|---|---|
| 3,149,224 | 9/1964 | Horne et al. | |
| 3,196,255 | 7/1965 | Beauchamp et al. | |
| 3,175,077 | 3/1965 | Fox et al. | |
| 3,176,212 | 3/1965 | De Puy | 321—18 X |
| 3,204,113 | 8/1965 | Snygg. | |
| 3,207,975 | 9/1965 | Pintell. | |
| 3,210,640 | 10/1965 | Baker | 321—40 |
| 3,226,627 | 12/1965 | Fromkin | 323—22 |

JOHN F. COUCH, *Primary Examiner.*

W. SHOOP, JR., *Assistant Examiner.*